United States Patent [19]

Gram

[11] 4,396,367
[45] Aug. 2, 1983

[54] APPARATUS FOR USE BY PICKING UP ICE LOLLIES FROM AN ICE-LOLLY FREEZING MACHINE

[75] Inventor: Hans Gram, Vojens, Denmark

[73] Assignee: Brødrene Gram A/S, Vojens, Denmark

[21] Appl. No.: 357,804

[22] Filed: Mar. 15, 1982

[30] Foreign Application Priority Data

Mar. 30, 1981 [DK] Denmark .............................. 1432/81

[51] Int. Cl.³ .......................... B29C 7/00; B29D 31/00
[52] U.S. Cl. ..................................... 425/441; 62/300; 62/353
[58] Field of Search ............... 425/441, 443, 438, 442, 425/182, 188, 126 S; 62/298, 300, 336, 353

[56] References Cited

U.S. PATENT DOCUMENTS

| 1,562,331 | 11/1925 | Jamieson | 425/438 |
| 1,872,327 | 8/1932 | Patten | 425/438 |
| 3,407,755 | 10/1968 | Rasmussen | 425/441 |

Primary Examiner—Willard E. Hoag
Attorney, Agent, or Firm—Watson, Cole, Grindle & Watson

[57] ABSTRACT

For picking up ice lollies which have been frozen in split moulds which are adapted to be inserted into rows of freezing pockets of an ice-lolly machine, an appartus is used comprising two rods. One of the rods is connected with one of the mould parts in each of the freezing pockets, and the other rod is connected with the other mould part in the freezing pocket. Means are arranged at the ends of each rod for engaging guiding means at a pick-up station. The guiding means are adapted for moving the rods away from each other after withdrawal of the lower moulds in question and for moving the rods towards each other after the ice lollies have been removed, and for inserting the moulds in the row of freezing pockets. The apparatus automaticizes the withdrawal and the insertion of the moulds in such a way that such withdrawal and insertion and the removal of the ice lollies may be carried out during the same working operation which is used by picking up ice lollies in normal automatic ice-lolly freezing machines.

8 Claims, 7 Drawing Figures

APPARATUS FOR USE BY PICKING UP ICE LOLLIES FROM AN ICE-LOLLY FREEZING MACHINE

BACKGROUND OF THE INVENTION

The present invention relates to an apparatus for use by picking up ice lollies frozen in split moulds adapted to be inserted into rows of freezing pockets in an ice lolly freezing machine.

As regards the prior art, reference is made to the British Patent specification No. 645,747. This patent teaches to insert split moulds in respective freezing pockets. The mould cavities thereby formed may be given undercut shapes unlike ordinary freezing pockets which, as is well-known, must diverge in the direction of withdrawal of the subject ice lolly. According to said prior art, the mould parts are provided with eye screws to enable the mould parts to be withdrawn and inserted manually into the associated freezing pocket. After withdrawing a mould the two parts of the mould are separated and the figure formed is removed.

SUMMARY OF THE INVENTION

The apparatus according to the present invention is characterized in that for a row of freezing pockets it comprises two rods, one of which is connected to one mould part of each of the subject freezing pockets, the other rod being connected to the other mould part of each of the subject freezing pockets. The ends of each rod are provided with means for engagement with guiding means at a pick-up station and the guiding means are formed to move the rods away from each other after withdrawal of the subject row of moulds and to move the rods toward each other after removal of the ice lollies and for insertion of the moulds into the row of freezing pockets. Such a pick-up apparatus makes it possible to combine the withdrawal, the removal of the ice lollies and the insertion of the moulds into the freezing pockets in the same operation as the picking-up of ice lollies in conventional automatic ice-lolly freezing machines.

To ensure positive guidance of the mould parts during their withdrawal from the freezing pockets, their separation, their joining and their insertion into the freezing pockets, one embodiment of the apparatus according to the invention is characterized in that the engaging means at each end of the two rods consist of an L-shaped gripper member having a guide pin and that the associated guiding means for each rod end consist of a guide block having a guide pin and a recess for engagement with the corresponding gripper member and of an end plate having angular guideways for engagement with the guide pins.

To ensure positive guidance of each L-shaped gripper member, the recess of the guide block may according to a further embodiment of the invention face the associated end plate and have a depth generally corresponding to the base of the corresponding gripper member.

To provide additional assurance of parallel guidance of the two rods and accordingly also of the mould parts supported by the latter, the guide blocks according to yet another embodiment of the invention may be slidably mounted on a transverse shaft at each end plate, and the shafts may be supported by a frame enclosing the end plates. The frame may be provided with means for lifting and lowering the frame. This has the added advantage that the mould parts may be compulsory guided away from each other, i.e. by lifting the frame.

According to a further embodiment of the apparatus according to the invention the apparatus may include an upwardly and downwardly movable gripper shaft provided with pick-up tongs whose number corresponds to the number of freezing pockets in the subject row. The gripper shaft may be constituted by or connected to the conventional gripper lifting mechanism of the ice-lolly freezing machine. Such an embodiment greatly helps fitting the apparatus into the normal operating cycle of an ice-lolly freezing machine.

To ensure positive gripping of the tongs of the gripper shaft relatively to the ice lollies, the gripper shaft according to still another embodiment of the invention may be formed to initiate lifting of the rods, i.e. via the ice lollies gripped by their sticks.

As the mould parts require a relatively high lifting movement in order to clear the freezing pockets, the gripper shaft may be connected by link means to a supporting rod, and each end plate may at the top have an upwardly open recess, the extreme end of which diverges. This results in positive guidance of the supporting rod and, accordingly, also of the supported gripper shaft and the tongs for positive gripping of the sticks of the ice lollies. Due to the distance obtained between the supporting rod and the gripper shaft by the link means, it is furthermore made possible to use tongs of a type known per se and normally used in connection with machines for making ice lollies.

DESCRIPTION OF THE PREFERRED EMBODIMENTS

Figure 1A:
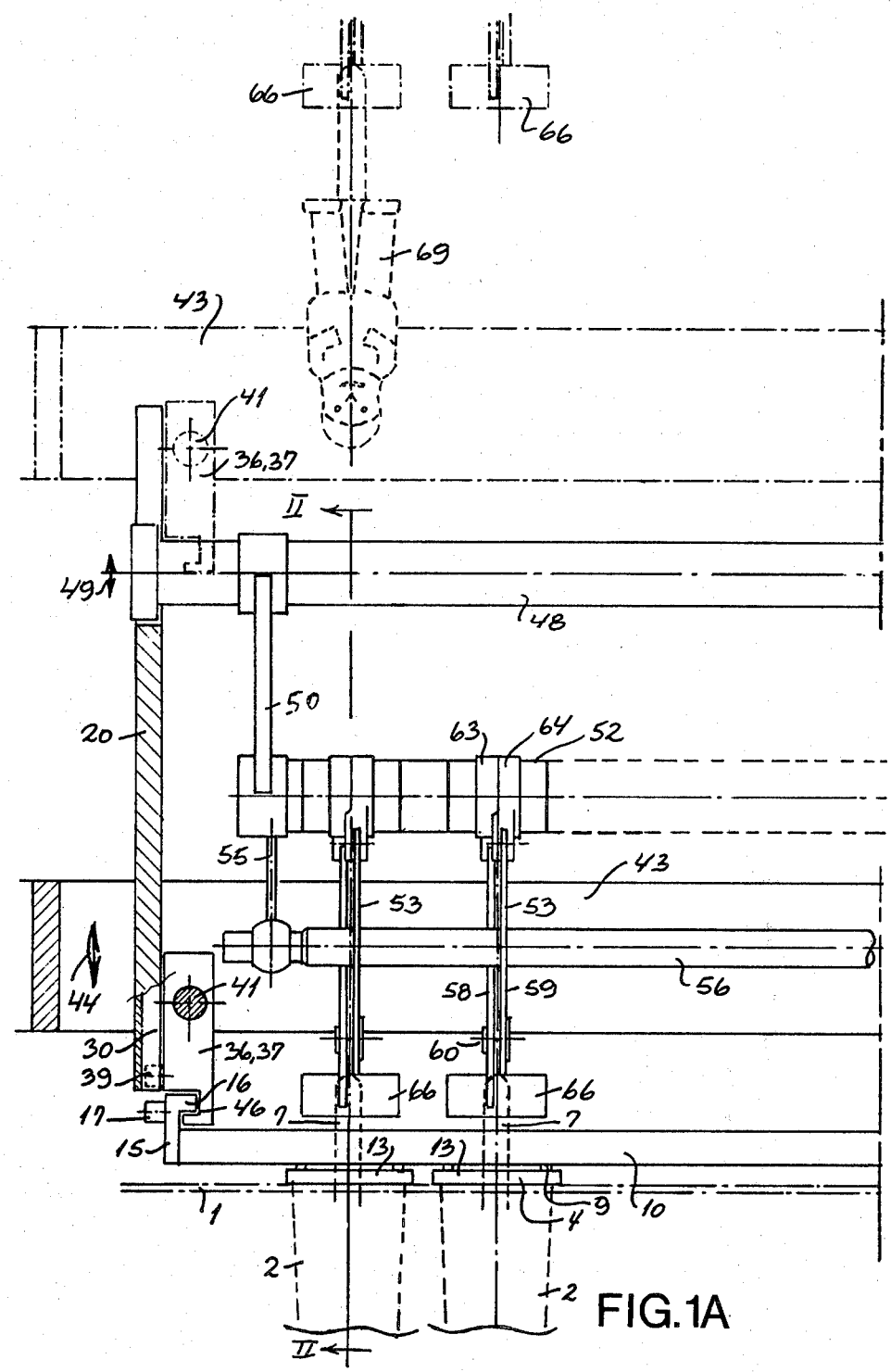
FIGS. 1A and 1B show a longitudinal sectional view of an embodiment of the pick-up apparatus according to the invention, taken generally along the line I—I of FIG. 2.
Figure 1B:
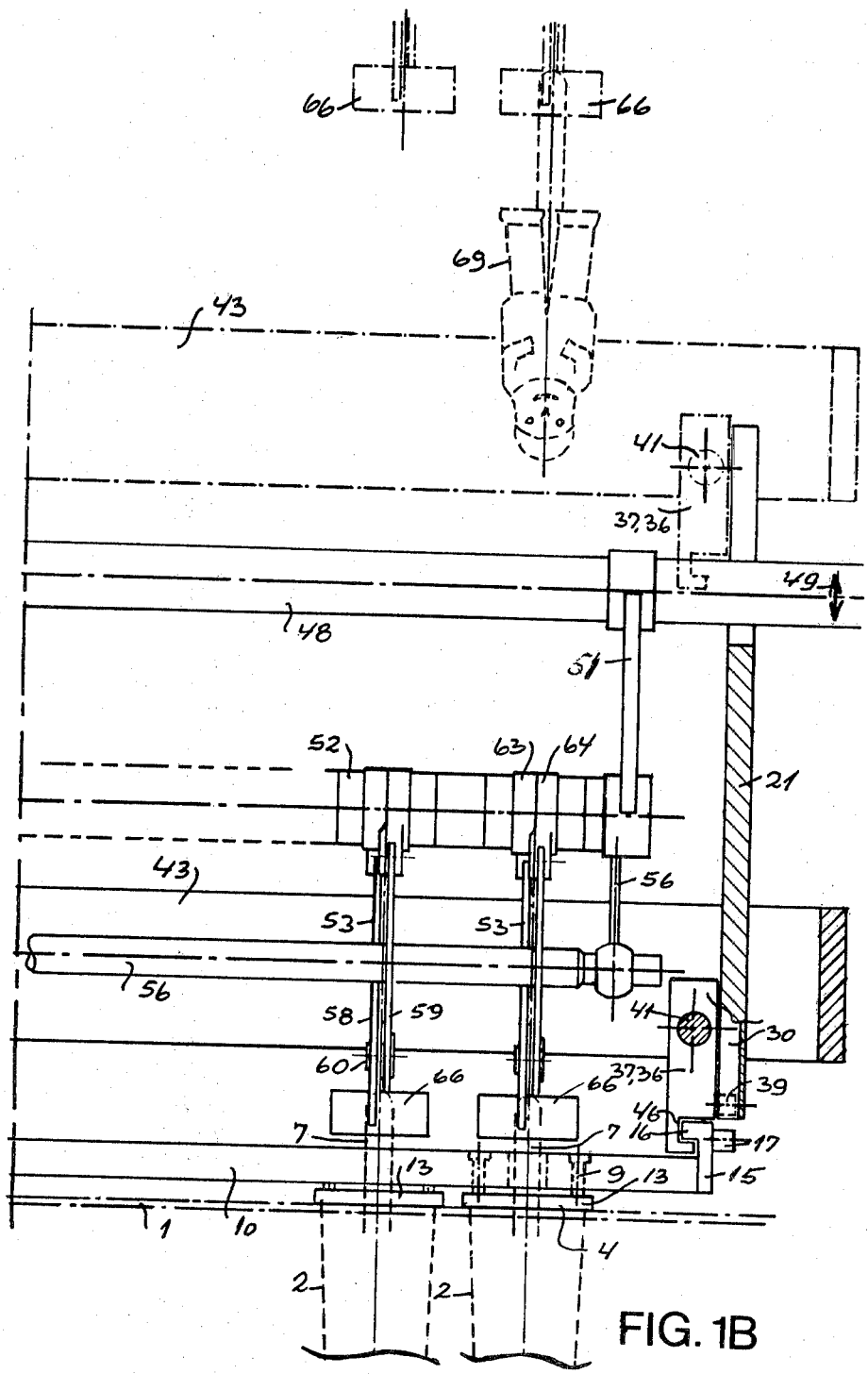

In the drawings numeral 1 designates a rotating freezing table for a freezing machine of a type known per se, comprising radial rows of freezing pockets 2. It will thus be understood that FIGS. 1A and 1B represent a vertical radial sectional view of a radial row of freezing pockets for such a machine. As stated such a machine comprises a rotatable table 1 having radial rows of freezing pockets 2, and in machines of the type referred to in this connection the table is turned horizontally and stepwise, i.e. corresponding to the angle between two adjacent radial rows of freezing pockets. In this manner the freezing pockets are moved through a plurality of stations, viz. a filling station at which cream or juice to be frozen is introduced into the pockets, a station for inserting sticks into the partly frozen cream or juice, a freezing zone and a thawing zone, after which the rows of freezing pockets arrive one at a time to a pick-up station, and this is the one illustrated in FIGS. 1A and 1B in vertical section. In the freezing zone the exterior of the freezing pockets 2 are flushed with a coolant, and in the thawing zone the exterior of the freezing pockets 2 are flushed with a thawing medium to loosen the frozen bodies to enable these to be withdrawn from the freezing pockets.

Figure 2:
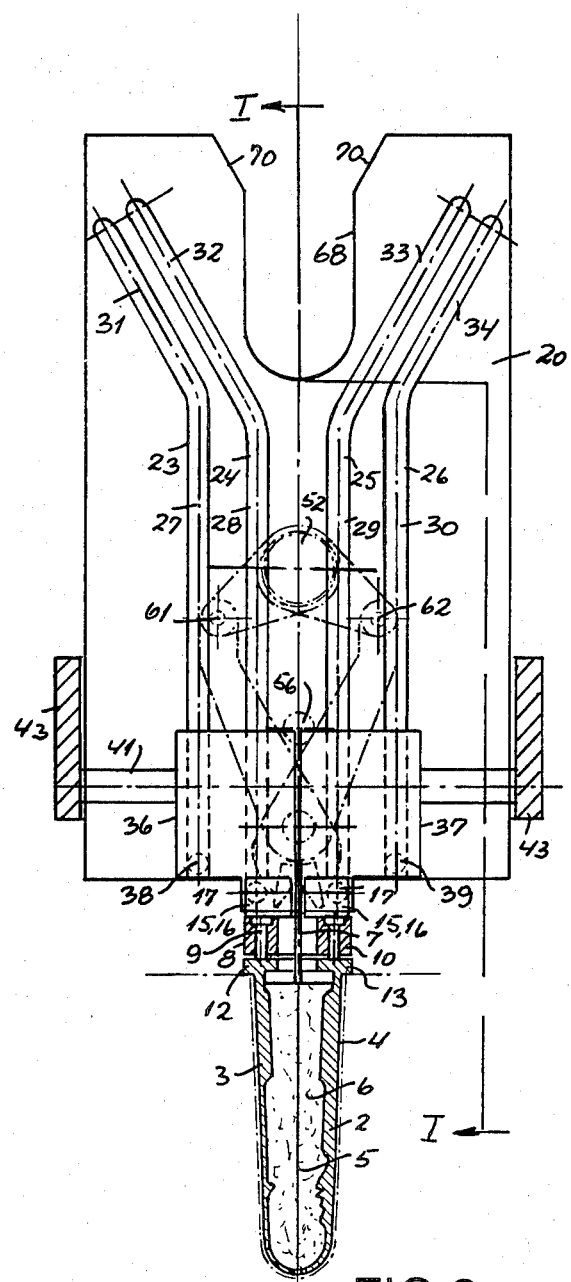
FIG. 2 shows a sectional view taken along the line II—II of FIG. 1A.

As will appear from FIG. 2, a mould consisting of two mould parts 3 and 4 is inserted in each freezing pocket. In the joined position of these parts their outer configuration corresponds to the inside of a freezing pocket 2. In FIG. 2 the dividing plane between the two mould parts is designated 5. In their inserted position the two mould parts 3 and 4 form an upwardly open mould cavity 6 which during an earlier phase of the operating cycle of the ice-lolly freezing machine has been filled with ice cream or juice, after which the ice cream or the juice has been partly frozen, whereupon an ice-lolly stick 7 has been inserted into the open end of the mould and frozen fast in the cream or juice.

The mould parts 3 for the row of freezing pockets shown in FIGS. 1A and 1B are connected to a horizontal rod 8, FIG. 7, i.e. by means of screws as indicated at 9, and in the same manner the other mould parts 4 for the same row of freezing pockets are connected to a rod 10. The screws 9 are screwed into the mould parts 3 and 4 and extend through holes in the rods 8 and 10. The holes are slightly wider than the screw necks in order to allow the mould parts 3 and 4 to move a little.

Each mould part 3 and 4 is provided with a small collar 12, 13 which, in the inserted position of the mould, rests upon the top of the table 1, but it will be appreciated that the two mould parts as regards their outer configuration should correspond as closely as possible to the inside of the associated pocket 2 to obtain optimum heat transfer.

An L-shaped gripper member 15 is secured to each end of the rods 8 and 10 as clearly indicated in FIGS. 1A and 1B as far as the rod 10 is concerned. The gripper members 15 have their bases 16 turned upwardly and inwardly toward the centre of the associated rod, and the outside of each gripper member 15 is provided with a guide pin 17.

The pick-up apparatus comprises two end plate members 20, 21 arranged in fixed relationship to the subject ice-lolly freezing machine, i.e. with an interspacing which is slightly longer than the length of a radial row of freezing pockets. Furthermore, as will be understood, the end members 20 and 21 are arranged at the pick-up station.

As will appear from FIG. 2, four guideways or guiding grooves 23, 24, 25, 26 are provided in each end member 20 and 21. These guideways are angular and comprise vertical lower branches 27, 28, 29, 30 and inclined upper branches 31, 32, 33, 34. Moreover, for each end member two guide blocks 36 and 37 are provided each having a guide pin 38 and 39, respectively, for engagement with the two outer guideways 23 and 26, respectively. The two guide blocks 36 and 37, furthermore, are slidably mounted on a transverse shaft 41.

As the end member 21 at the opposite end of the pick-up apparatus is designed similarly to the end member 20, it should be unnecessary to set forth a further explanation of the structure of the end member 21.

The shafts 41 of the two pairs of guide blocks are secured to a rectangular frame 43 which, as indicated by means of a double arrow 44 in FIG. 1A, is movable upwardly and downwardly by means, not shown. The frame 43 extends horizontally and around the two end plates 20 and 21 with a little clearance in relation thereto, as it appears from FIG. 2.

At their lower ends each guide block 36, 37 is provided with a lateral recess 46 opening adjacent the associated end member 20, 21 as clearly shown in FIGS. 1A and 1B. In the positions of the blocks shown in FIG. 1A and 1B the recesses 46 are positioned just below the lower edges of the end members 20 and 21.

The pick-up apparatus further includes a horizontal supporting rod 48 which as indicated by the double arrow 49 is likewise movable upwards and downwards by means, not shown. From the supporting rod 48 a gripper shaft 52 is suspended by means of two links 50 and 51. The gripper shaft 52 supports a plurality of pick-up tongs 53, i.e. corresponding to the number of freezing pockets 2 of a radial row. From the gripper shaft 52 there is further suspended by means of two links 55, 56 a shaft 56 for operating the tongs.

Figure 5:
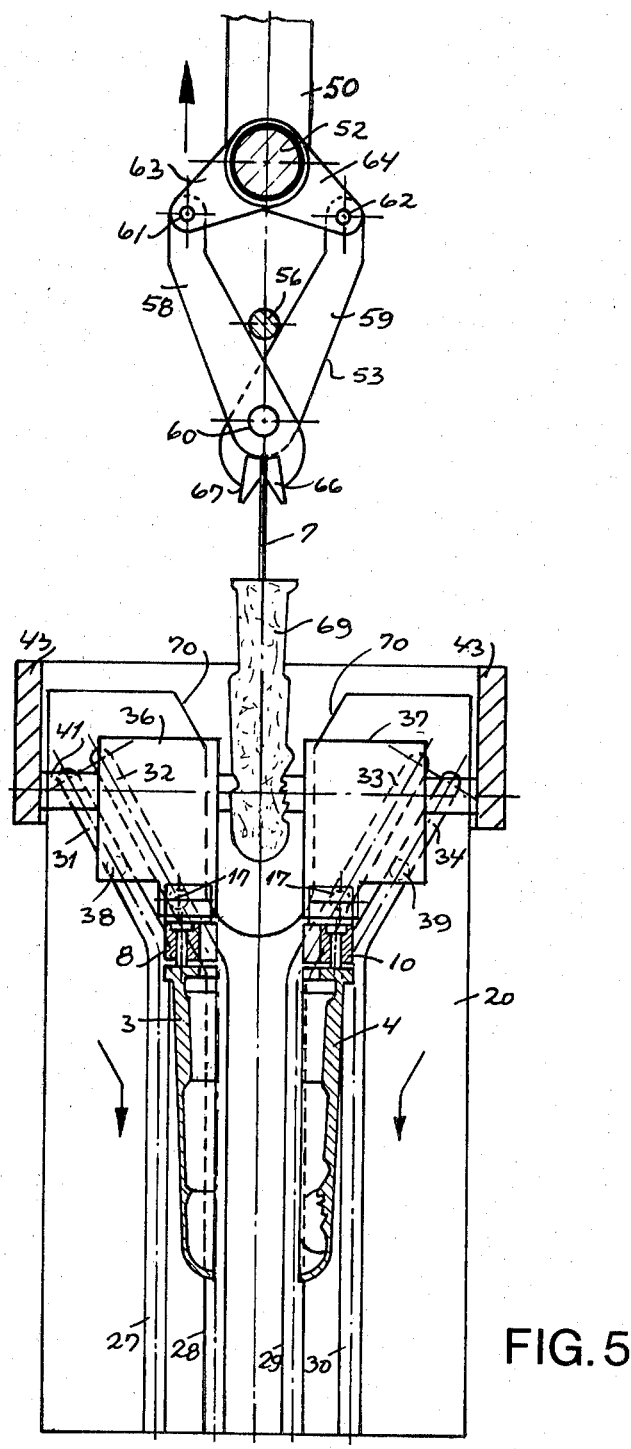

As it clearly appears from FIG. 5, each of the tongs 53 comprises two levers 58, 59 which are pivotally interconnected by means of a pivot 60. At their upper end each lever 58 and 59, respectively, is connected by means of a pin 61 and 62, respectively, to an arm 63 and 64, respectively, which is pivotally mounted on the gripper shaft 52.

Below the pivot pin 60 each lever 58 and 59, respectively, is provided with a jaw 66 and 67, respectively.

The pick-up apparatus shown operates in the following way:

As the table 1 is rotated to reach the pick-up position for the row of freezing pockets 2 shown, the bases 16 of the L-shaped gripper members 15 enter the lateral recesses 46, 46 of the two pairs of guide blocks 36, 37 sideways, due to the fact that the bases 16 occupy the positions shown in FIGS. 1A and 1B. In the inserted position of the mould part 3, 4, the rods 8, 10 have a mutual distance such that the guide pins 17 on the sides of the gripper members 15 have a mutual distance corresponding to the lower ends of the guideways 24, 25. After the rods 8, 10 have arrived at the positions shown in FIG. 2, the supporting rod 48 is lowered and accordingly also the tongs 53, whereby their jaws 66, 67 are moved down on either side of respective ice-lolly sticks 7. When the supporting rod 48 is then moved upwards it will lift the gripper shaft 52 thereby causing the jaws 66, 67 to clamp the ice-lolly sticks 7 with the effect that the bodies frozen in the mould cavities 6 and the mould parts 3, 4 will be lifted from the associated freezing pockets 2. The rods 8, 10 are lifted simultaneously whereby the guide pins 17, 17 are moved into the lower end of the guideways 24, 25. At the same time the guide blocks 36, 37 will be moved upwards and accordingly also the supporting frame 43. This movement of the supporting frame 43 may be supplemented by its actuating means, not shown.

Figure 3:
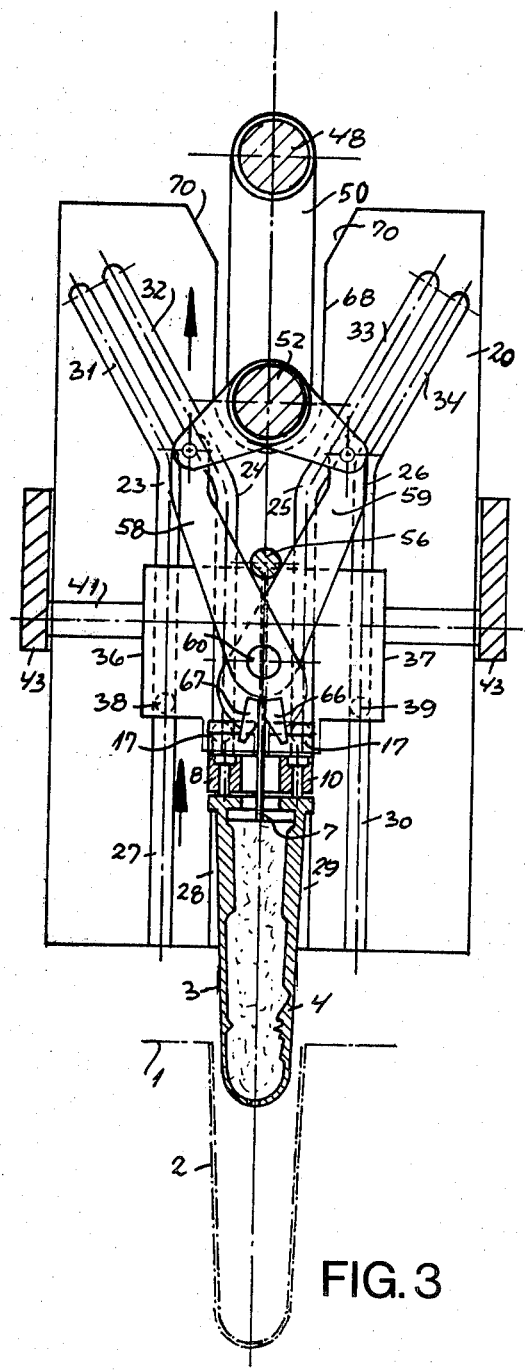
FIG. 3 shows a sectional view corresponding to that illustrated in FIG. 2 but where the apparatus is shown in a different operating phase.

In this connection it should be noted that the tongs 53 in FIG. 2 is shown in dotted lines to indicate that they have just be lowered to engage the ice-lolly sticks 7. In FIG. 3 the mould parts 3, 4 are shown after having been lifted partly out from the freezing pockets 2, and it will be noted that the guide pins 38, 39 of the two guide blocks 36, 37 have been moved upwardly along the vertical branches 27, 30 of the two guideways 23, 26. It will also be noted that the pins 17, 17 have been moved upwardly along the lower branches 28, 29 of the guideways 24, 25.

As will appear from FIG. 3 in particular, the staggered relationship between the pins 38, 39 and the guide pins 17, 17 which is caused by the fact that the latter are arranged at a lower level than the former, causes the mould parts 3, 4, apart from their pivotable suspension from the rods 8 and 10, to be compulsorily guided in parallel relationship to each other. Such positive guiding is also supported due to the fact that the blocks 36, 37 are slidably mounted on their respective shaft 41 and thus prevented from any pivoting movement.

Figure 6:
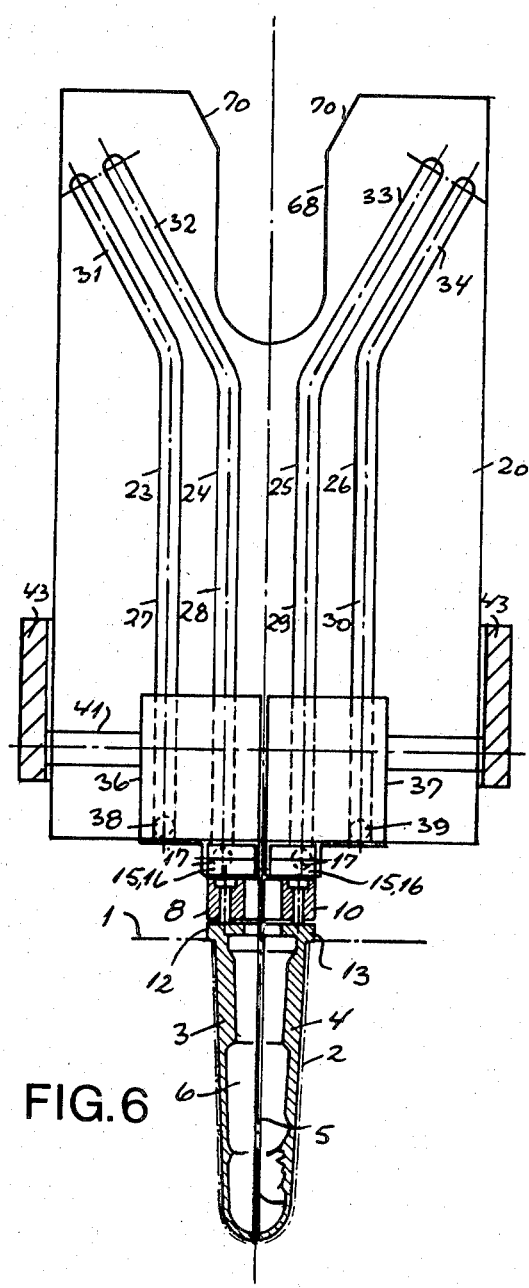

During a continued upward movement, the mould parts 3 and 4 by virtue of the divergence between the inclined branches 31, 32, 33, 34 will be moved away from each other after the moulds have been lifted clear of the respective freezing pockets. In this manner the mould parts 3 and 4 are forced away from each other, whereby the frozen bodies are released and now remain suspended in the tongs by means of their associated ice-lolly sticks 7. It will be understood that during the separating movement of the mould parts, it is the actuating means of the frame 43 which fully take over movement of the supporting frame and, accordingly, also of the shafts 41 and the blocks 36, 37 slidably mounted thereon. After arriving at the position shown in FIG. 4, the bodies formed may now be lifted and removed from the frame 43, after which the formed bodies suspended from the tongs 53, may be rotated to a depositing position by means of the supporting rod 48. In this depositing position the operating shaft 56 is actuated to cause the tongs to separate and release the ice lollies for delivery, e.g. to a feed table for a packing machine. After this removal has taken place, the supporting frame 43 is again lowered until it assumes the position shown in FIG. 6 which, as regards the guide blocks 36, 37, corresponds to the position indicated in FIG. 2. During this lowering movement the shafts 41 of the supporting frame 43 effect via the rods 8, 10 a positive insertion of the mould parts 3, 4 into the respective freezing pockets 2 so as to provide intimate contact between their inside and the outside of the moulds. This contact also is supported by the pivotable suspension of the mould parts with respect to the rods 8, 10 which compensates for any inaccuracies as regards fitting.

The ice-lolly machine is now ready for another cycle during which the lower freezing pockets with inserted, just emptied, mould parts 3, 4 will be moved away from the pick-up apparatus shown, and another radial row of freezing pockets will arrive at the position shown in FIG. 2, after which the supporting rod 48 and accordingly also the gripper shaft 52 are again lowered to the position shown in FIG. 2, and the mode of operation described above is repeated.

As a relatively high lifting and lowering movement of the gripper shaft 52 is required owing to the guideways in the end members 20, 21, the gripper shaft 52, as explained above, is suspended from a supporting rod 48, and each end member 20, 21 has at the upper end a U-shaped recess 68. This allows the supporting rod 48 to be moved to a relatively low position, so that the tongs 53, supported by the gripper shaft 52, may be moved down to engage the sticks. This also allows the guide blocks to be moved along their relatively long guideways.

FIGS. 1A, B show figures 69 frozen by means of the split mould. The figures are indicated by means of dotted lines in their lifted positions. By virtue of the fact that the mould parts are moved away from each other for releasing the ice lollies it is possible, as will appear from the drawings, to make ice lollies of highly irregular and therefore attractive shapes.

It should also be noted that since the movements mentioned above, i.e. the stepwise rotation of the table 1 and the lifting and lowering of the pick-up tongs, are movements normally performed by an ice-lolly freezing machine, it is possible to provide existing ice-lolly freezing machines with a pick-up apparatus as explained above, due to the fact that the movements required of the table 1 and the upward and downward movement of the tongs 53 are already carried out in an ice-lolly freezing machine and accordingly only an auxiliary mechanism for moving the frame 43 is required, which movement, however, is readily provided by mounting the frame on two lifting cylinders, for instance.

In the embodiment illustrated in the drawings it will be seen that the recess 68 at the upper edge of each end member 20 and 21 has bevelled edges 70, which makes it possible, during the lowering movement explained above, to ensure positive guidance of the supporting rod 48 into a central part of the recess 68 and, accordingly, also a positive guidance of the clamping jaws 66, 67 for engagement with the sticks 7.

Figure 4:
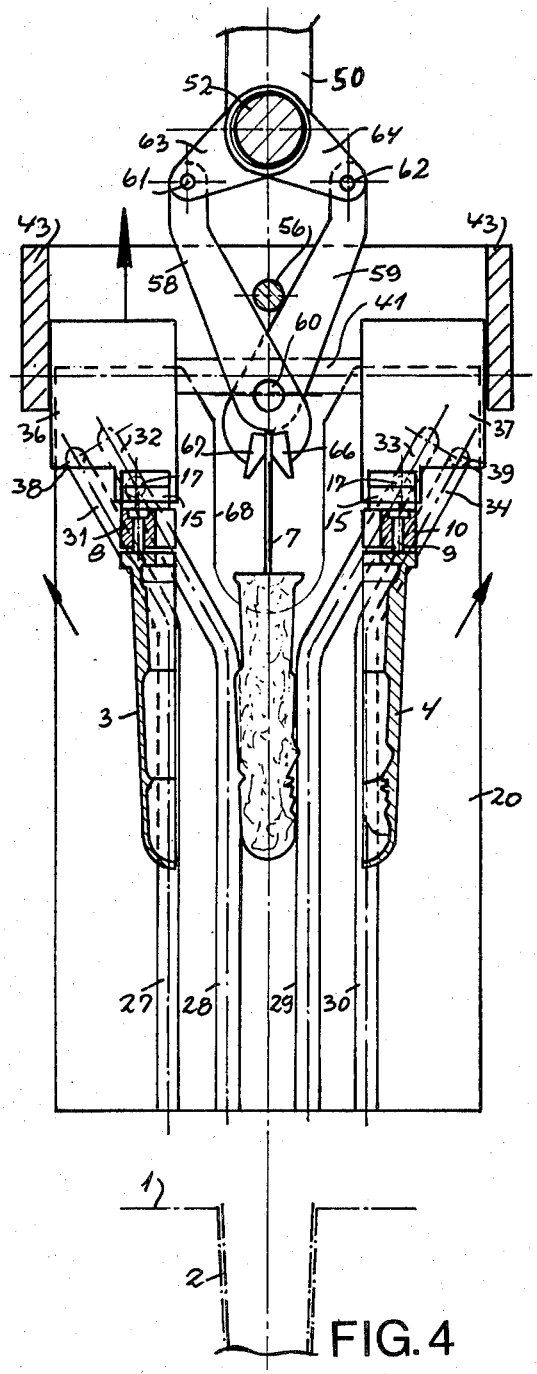
FIGS. 4, 5, and 6 show views corresponding to FIG. 3, however, illustrating additional operating phases of the apparatus.

From FIG. 1A it will further be noted that the base 16 of the L-shaped gripper member 15 has a width generally corresponding to the depth of the lateral recess 46 in such a manner that the subject gripper member 15, when the associated rod 10 is being lifted and the guide pin 17 of the gripper member is being inserted in its respective guideway 30, will be trapped between the bottom of the recess 46 and the end member 20, with the effect that the subject gripper member 15 will be positively guided during its full movement along its respective guideway 24, and in particular when the associated guide block 36, as will appear from FIG. 4, is moved laterally on the shaft 41 away from the adjacent block 37 during the separation of the mould parts 3 and 4.

I claim:

1. Apparatus for use by picking up ice lollies frozen in split moulds adapted to be inserted into rows of freezing pockets in an ice-lolly freezing machine, characterized in that the apparatus comprises for a row of freezing pockets two rods one of which is connected to one mould part of each of the subject freezing pockets, the other rod being connected to the other mould part of each of the subject freezing pockets, that the ends of each rod are provided with means for engagement with guiding means at a pick-up station, said guiding means being adapted to move the rods away from each other after withdrawal of the subject row of moulds and to move the rods toward each other after removal of the ice lollies and for insertion of the moulds into the row of freezing pockets.

2. Apparatus as claimed in claim 1, characterized in that the apparatus is adapted to pick up the moulds, separate same, remove the frozen bodies and insert the moulds in the associated freezing pockets in the same operation as the picking up of ice lollies in conventional automatic ice-lolly freezing machines.

3. Apparatus as claimed in claim 1, characterized in that the engaging means at each end of the two rods consist of an L-shaped gripper member having a guide pin and that the associated guiding means for each rod end consist of a guide block having a guide pin and a recess for engagement with the corresponding gripper member and of an end plate member having angular guideways for engagement with said guide pins.

4. Apparatus as claimed in claim 3, characterized in that the recess of the guide block faces the corresponding end member and has a depth generally corresponding to the base of the corresponding gripper member.

5. Apparatus as claimed in claim 3, characterized in that the guide blocks are slidably mounted on a transverse shaft at each end member, and that the shafts are supported by a frame enclosing the end members, said frame being connected to means for lifting and lowering the frame.

6. Apparatus as claimed in claim 1, characterized in that the apparatus includes an upwardly and downwardly movable gripper shaft with picking up tongs whose number corresponds to the number of freezing pockets in the subject row, said gripper shaft being constituted or connected to the normal gripper lifting mechanism of the ice-lolly freezing machine.

7. Apparatus as claimed in claim 6, characterized in that the gripper shaft is adapted to initiate lifting of the rods.

8. Apparatus as claimed in claims 3 or 6, characterized in that the gripper shaft is connected by link means to a supporting rod, and that each end member at its top is provided with an upwardly open recess whose outwardly directed end diverges.

* * * * *